United States Patent
Vauchel

(10) Patent No.: US 9,051,054 B2
(45) Date of Patent: Jun. 9, 2015

(54) NACELLE FOR TURBOJET ENGINE

(75) Inventor: Guy Bernard Vauchel, Harfleur (FR)

(73) Assignee: AIRCELLE, Gonfreville l'Orcher (FR)

( * ) Notice: Subject to any disclaimer, the term of this patent is extended or adjusted under 35 U.S.C. 154(b) by 840 days.

(21) Appl. No.: 12/865,016

(22) PCT Filed: Oct. 17, 2008

(86) PCT No.: PCT/FR2008/001464
§ 371 (c)(1),
(2), (4) Date: Oct. 12, 2010

(87) PCT Pub. No.: WO2010/000953
PCT Pub. Date: Jan. 7, 2010

(65) Prior Publication Data
US 2011/0033286 A1 Feb. 10, 2011

(30) Foreign Application Priority Data
Jan. 29, 2008 (FR) ...................................... 08 00472

(51) Int. Cl.
*F02C 7/045* (2006.01)
*B64D 33/02* (2006.01)

(52) U.S. Cl.
CPC ........ *B64D 33/02* (2013.01); *B64D 2033/0206* (2013.01); *B64D 2033/0286* (2013.01); *F02C 7/045* (2013.01); *Y02T 50/671* (2013.01)

(58) Field of Classification Search
CPC ............................. F01D 21/04; F01D 21/045
USPC ............................. 415/9, 173.1, 173.4, 174.4
See application file for complete search history.

(56) References Cited

U.S. PATENT DOCUMENTS 5,259,724 A * 11/1993 Liston et al. ..................... 415/9
6,123,170 A * 9/2000 Porte et al. ..................... 181/214

FOREIGN PATENT DOCUMENTS

| FR | 2847304 | 5/2004 |
| FR | 2869360 | 10/2005 |
| FR | 2898870 | 9/2007 |
| FR | 2903733 | 1/2008 |

OTHER PUBLICATIONS

International Search Report; PCT/FR2008/001464; Jul. 7, 2009.

* cited by examiner

*Primary Examiner* — Richard Edgar
(74) *Attorney, Agent, or Firm* — Brinks Gilson & Lione

(57) ABSTRACT

The present invention relates to a nacelle for a turbojet engine comprising an air intake structure able to channel an airflow towards a fan of the turbojet engine, and a middle structure comprising a casing (9) intended to surround the said fan and to which the air intake structure is attached, the latter structure having at least one peripheral interior panel (41), characterized in that the casing extends around the fan more or less as far as the fan blades (8), the air intake structure being connected to the casing by the interior panel by means of at least one structural peripheral flange (15) capable of providing containment for at least one blade should the latter break off.

6 Claims, 3 Drawing Sheets

NACELLE FOR TURBOJET ENGINE

TECHNICAL FIELD

The present invention concerns a nacelle for turbojet engine comprising an air intake structure capable of directing a flow of air towards a fan of the turbojet engine and a middle structure including a casing intended to surround said fan and to which the air intake structure is attached, the latter having at least one peripheral inner panel.

BACKGROUND

An airplane is propelled by one or several propeller assemblies comprising a turbojet engine housed in a tubular nacelle. Each propeller assembly is attached to the airplane by a mast situated generally under a wing or at the fuselage.

A nacelle generally has a structure comprising an air intake upstream from the engine, a middle section designed to surround a fan of the turbojet engine, and a downstream section housing thrust reverser means and intended to surround the combustion chamber of the turbojet engine, and generally ends with a jet nozzle whereof the outlet is situated downstream from the turbojet engine.

The air intake comprises, on one hand, an intake lip adapted to allow optimal collection toward the turbojet engine of the air necessary to supply the fan and the internal compressors of the turbojet engine, and on the other hand, a downstream structure on which the lip is attached and designed to suitably channel the air toward the blades of the fan. The assembly is attached upstream from a case of the fan belonging to the middle section of the nacelle.

The fan case is intended to surround the fan zone of the turbojet engine and ends upstream essentially at the vanes of the fan.

However, one should take into account the accidental case of the loss of a fan vane. To do this, the case is generally extended, via an extension called vane retention extension, until it forms a debris angle of about 15° (generally) relative to an attachment leg of said vane.

This extension defines the position of attachment flanges between the fan case and an inner panel of the air intake structure. Upstream from said interface, there is therefore no need to consider the apparent air intake structure as having to be capable of retaining the vane debris, which makes it possible to have lightened structure.

For acoustic reasons, it is sometimes necessary to avoid an acoustic panel rupture at the attachment flanges, as illustrated in document FR 2 847 304, and to extend the acoustic surface of the acoustic shroud of the air intake upstream of the vane heads above the vane retention extension, as illustrated in document FR 2 869 360, where an acoustic panel of the air intake structure extends until it covers said vane retention extension.

Document FR 2 898 870 also describes such a geometry.

However, in this case, the structure of the acoustic panel downstream from the attachment flanges is overhanging and can create significant aerodynamic disruptions (vibratory effects, uncontained geometric tolerances), which risks causing aeroacoustic disruptions more significant than the gain due to the attached acoustic surface.

Moreover, it is also necessary to take into account the provision of attachment flanges of the acoustic panel which, mounted on an outer skin of the acoustic panel for stress pick-up and structural maintenance reasons, requires having an extended interface and a sufficient structure thickness for the transit of the stresses. This has an impact on the mass of the assembly. These attachment flanges can also require supplementary structural reinforcement by rivets, which damages the acoustic response quality of the cells impacted by the housing of the bulbs of said rivets.

BRIEF SUMMARY

The present invention aims to resolve the aforementioned drawbacks and concerns, to do this, a propeller assembly including a nacelle housing a turbojet engine, said propeller assembly comprising an air intake structure capable of directing a flow of air towards a fan of the turbojet engine and a middle structure including a case surrounding said fan and to which the air intake structure is attached via at least one peripheral inner panel of said air intake structure, characterized in that the case extends around the fan essentially to the vanes thereof, the air intake structure being connected to the case by the inner panel via at least one structural peripheral flange belonging to the air intake structure and designed to ensure retention of at least one vane in case of loss thereof.

Thus, by realizing the vane retention element in the form of a fastening flange belonging to the air intake structure, the attachment plane between the case and the air intake structure is essentially at the fan vanes and is no longer offset upstream. One thereby avoids the presence of acoustic ruptures on the inner panel as well as any overhang generating vibrations.

Moreover, the connecting flange being elongate, one has a more significant attachment surface between the flange and the inner panel and therefore better stress pick-up.

It will also be noted on one hand, that the attachment between the air intake structure and the fan case is done outside the acoustic zone, and on the other hand, that the flange is independent of the fan case and can therefore easily be changed alone in case of damage.

Preferably, the structural flange extends longitudinally toward the upstream of the air intake structure such that it extends over a sector forming an angle of at least 15° with a fastening leg of the fan vanes. Such an angle is generally limited to 15° in order to avoid needlessly increasing the mass of the flange and consequently the mass of the assembly, but it is obvious that the sector can form an angle smaller or larger than 15° depending on the characteristics of the turbojet engine.

Advantageously, the structural flange is entirely peripheral.

Also advantageously, the structural flange is continuous.

Preferably, the inner panel is realized from at least one acoustic panel.

According to a first alternative, the inner panel of the air intake structure completely covers the structural flange.

According to a second alternative, the inner panel of the air intake structure partially covers the structural flange.

"Cover" means that the inner panel extends above or below the flange over the entire length or at least a portion thereof without necessarily being in contact with the flange over the entire length of the covering.

Advantageously, the case has an inner wall extending at least partially under the structural flange.

Also advantageously, the case also has an extension extending at least partially below the structural flange so as to cover the connecting means between the flange and the inner panel of the air intake structure.

BRIEF DESCRIPTION OF THE DRAWINGS

The implementation of the invention will be better understood with the detailed description provided below in light of the appended drawing.

DETAILED DESCRIPTION

Figure 1:
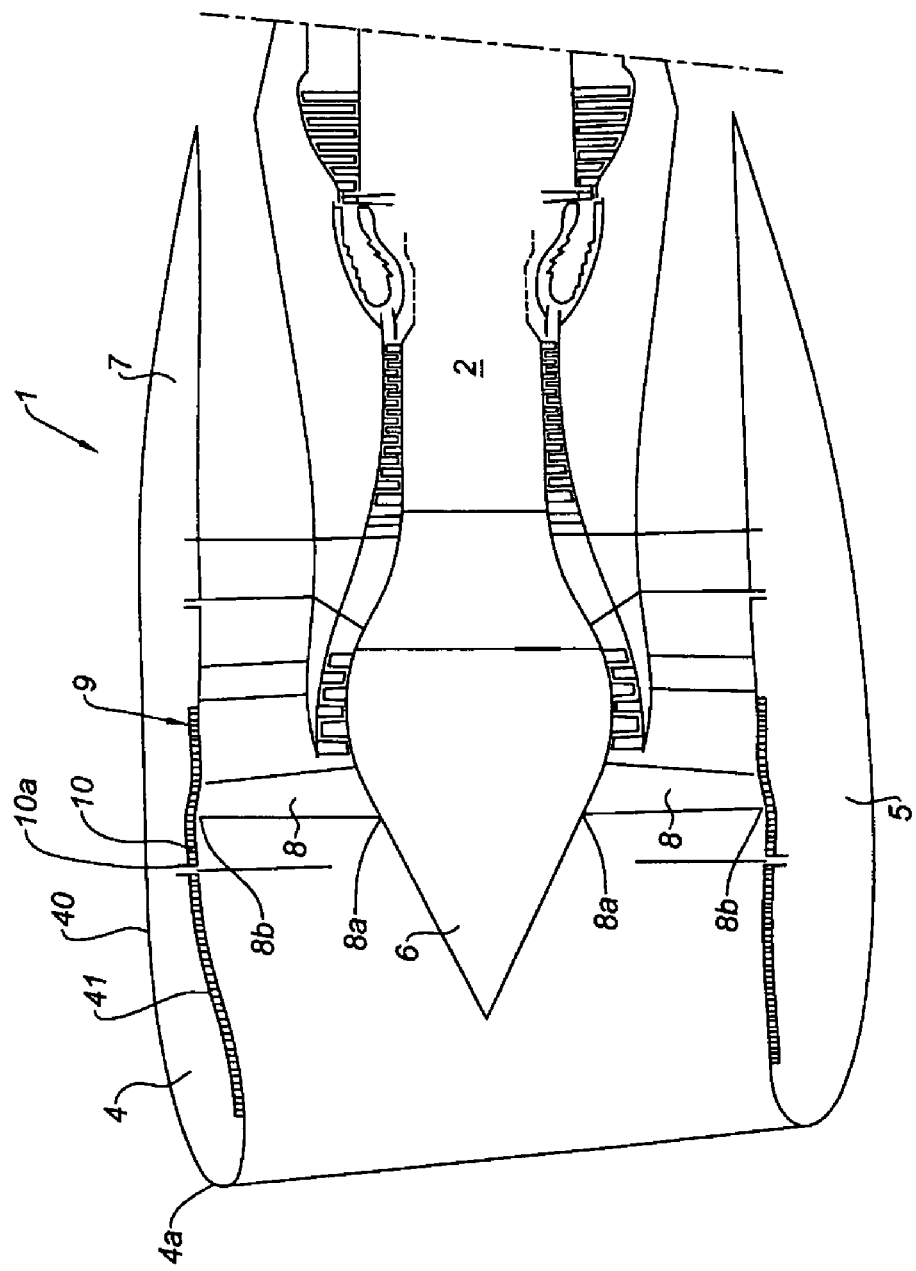
FIG. 1 is a diagrammatic view in longitudinal cross-section of a nacelle according to the prior art.

FIG. 1 very diagrammatically illustrates a nacelle 1 constituting a tubular housing for a dual-flow turbojet engine 2 of traditional design whereof it is used to direct the air flows that it generates by defining inner and outer aerodynamic lines necessary to obtain optimal performance. It also houses different components necessary to the operation of the turbojet engine 2 as well as related system such as a thrust reverser.

From its upstream end, the turbojet engine 2 includes, in a known manner, a compressor, a combustion chamber and a low-pressure turbine that in turn drives a fan 6 placed at the front of the turbojet engine 2.

The fan 6 supports a set of vanes 8 penetrating into an annular channel called "fan channel" defined between an outer jacket of the turbojet engine and an inner jacket of the nacelle 1.

The nacelle 1 possesses a structure comprising a front section forming an air intake 4, a middle section 5 surrounding the fan 6 and its vanes 8, and a rear section 7 surrounding the turbojet engine 2 and housing a thrust reverser system (not visible).

The air intake 4 presents a front portion 4a forming a an air intake lip 4a adapted to allow optimal collection toward the turbojet engine 2 of the air necessary to supply the fan 6 and the internal compressors of the turbojet engine 2, and on the other hand, a downstream structure on which the lip 4a is attached, comprising an outer panel 40 and an inner acoustic panel 41, and designed to suitably direct the air towards the vanes 8 of the fan 6.

The assembly is attached upstream from a case 9 of the fan 6 belonging to the middle section 5 of the nacelle 1 via the inner panel 41.

Figure 2:
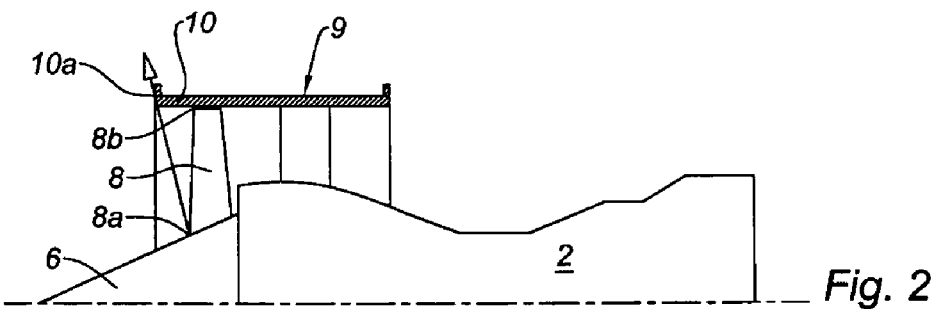
FIG. 2 is a partial enlarged view of the case of the nacelle of FIG. 1.
Figure 3:
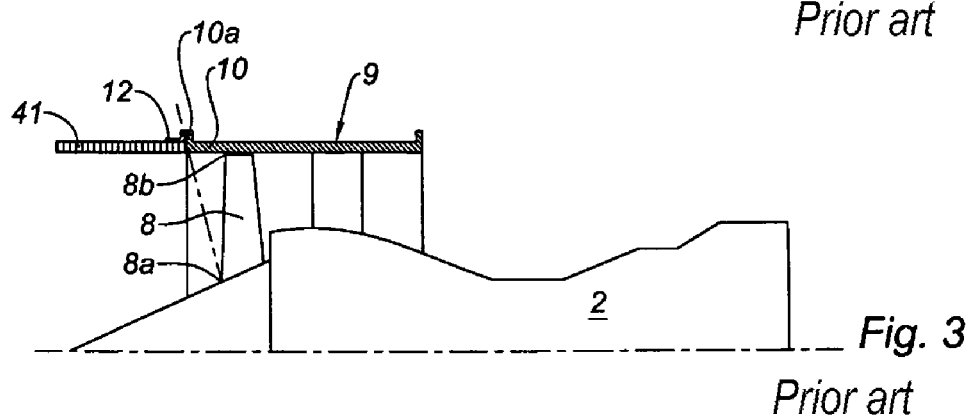
FIG. 3 is an enlarged diagrammatic illustration of the junction between the case and the inner panel of the air intake structure according to the prior art.
Figure 4:
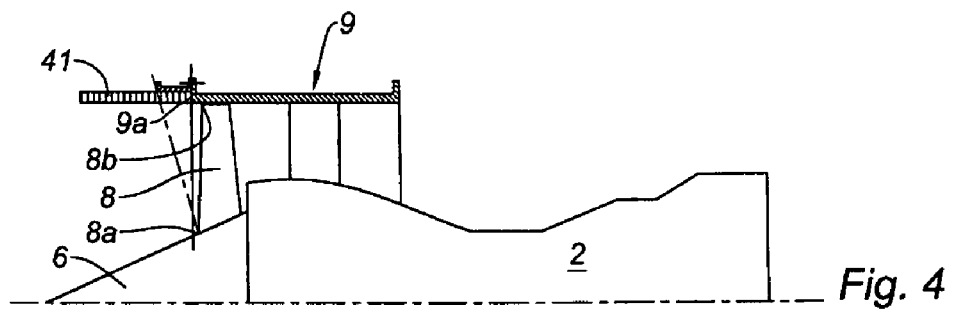
FIG. 4 is an enlarged diagrammatic illustration of the junction between the case and the inner panel according to the present invention.
Figure 5:
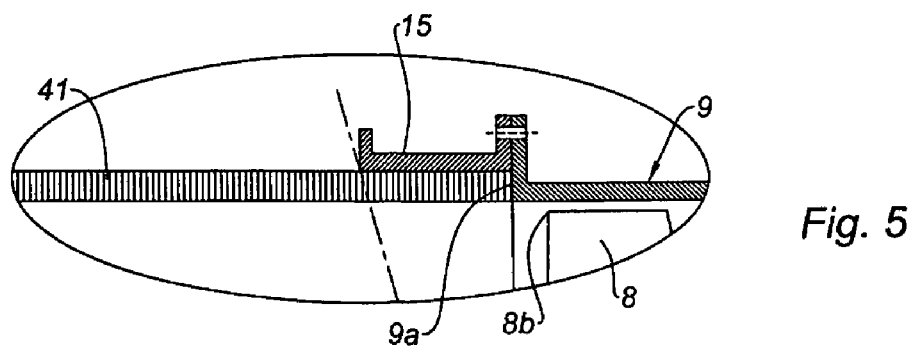
FIG. 5 is an enlarged illustration of FIG. 4.
Figure 6:
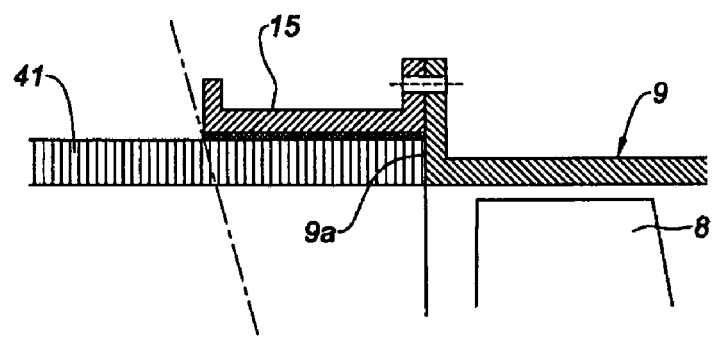
FIG. 6 is a diagrammatic illustration of a first alternative of the invention.

According to the prior art and as shown in FIGS. 1 to 3, the case 9 possesses a vane retention function in case of loss of one of the fan vanes and has, to do this, an extension 10 extending upstream beyond the fan 6 vanes 8 such that the angle formed from a fastening leg 8a of a vane between one vane 8 end 8b and an end 10a of said extension 10 is about 15°.

The connection between the air intake 4 and the fan case 9 is done by placing one or several connecting flanges 12 between said extension 10 and the inner panel 41.

In order to optimize the acoustic attenuation performance, the vane retention extension 10 of the case 9 can have a slight recess making it possible to extend the acoustic panel 41 of the air intake structure 4 to the fan 6 vanes 8 while covering said extension 10. However, such a solution has drawbacks that were explained above.

According to the invention, and as illustrated in FIGS. 4 to 9, the case 9 of the fan 6 no longer integrates vane retention extension and is limited, upstream from the nacelle, essentially at the fan vanes.

Because of this, the case 9 no longer extends essentially upstream from the nacelle 1 except at the ends 8b of the vanes 8 of the fan 6 and is connected by one end 9a to the inner panel 41 via a flange 15 capable of ensuring the retention of a vane 8 of the fan 6 in case of a loss of the latter.

Such an arrangement is diagrammatically illustrated in FIGS. 5 to 9.

Advantageously, the flange 15 extends longitudinally towards the upstream of the air intake structure such that its two ends form an angle of about 15° with a fastening leg 8a of the vanes 8 of the fan 6.

Figure 7:
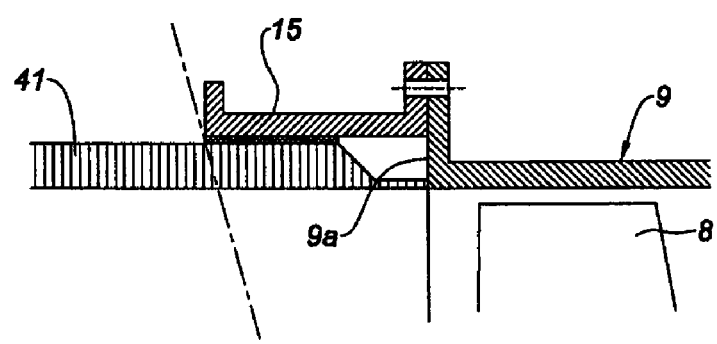
FIG. 7 is a diagrammatic illustration of a second alternative of the invention.

As illustrated in FIG. 7, the inner acoustic panel 41 can only partially cover the flange 15. The inner panel 41 then has a monolithic end. This is advantageous in case of need for structural reinforcement of the inner panel 41 itself. The remaining covering of the flange 15 on said inner panel 41 is sufficient not to require an addition of extra contact surface, which preserves the mass of the assembly.

Figure 8:
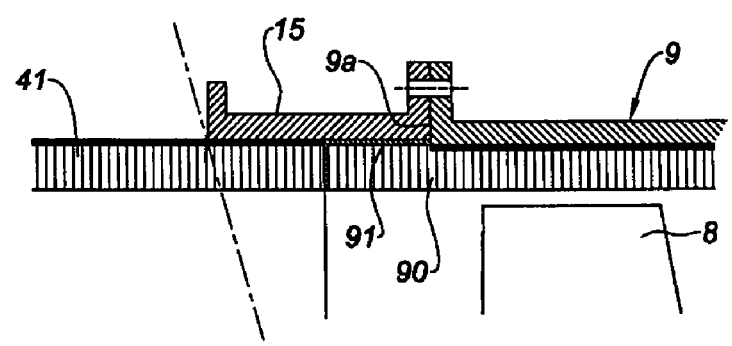
FIG. 8 is a diagrammatic illustration of a third alternative of the invention.

As shown in FIG. 8, the covering of the flange 15 can be partial by the inner panel 41 and completed by a panel 90 that can be abradable and equips the case 9, which extends upstream of the end 9a of the case partially below the flange 15. An extension 91 of the case 9 below the flange 15 can serve as interface between the panel 90 and the flange 15.

Figure 9:
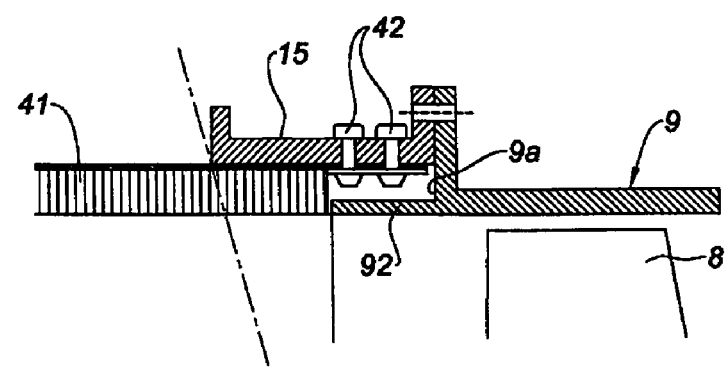
FIG. 9 is a diagrammatic illustration of a fourth alternative of the invention.

As illustrated in FIG. 9, the length of the flange 15 makes it possible to ensure a sufficient covering of the inner panel 41 and authorizes a mounting of the flange 15 on said inner panel 41 to the fastening means 42 situated in a monolithic downstream region of the inner panel 41. The upstream end 9a of the case 9 also has a non-structural extension 92 capable of covering the downstream of the flange 15 and of ensuring aerodynamic continuity with the inner panel 41.

Of course, other configurations can be considered. In particular, the fastening means 42 can be arranged upstream (FIG. 9) or downstream (not shown) of the junction plane of the flange 15 with the case 9 or may follow a particular shape of the inner panel 41 and not necessarily be rectilinear along the axial direction of the nacelle.

Although the invention has been described in connection with particular embodiments, it is obviously in no way limited thereto and it includes all technical equivalents of the means described as well as their combinations if they fall within the scope of the invention.

The invention claimed is:

1. A propeller assembly including a nacelle housing a turbojet engine, said propeller assembly comprising:
   an air intake structure capable of directing a flow of air towards a fan of the turbojet engine; and
   a middle structure including a case surrounding the fan and to which the air intake structure is attached via at least one peripheral inner panel of said air intake structure,
   wherein the case extends around the fan to essentially vanes thereof, the air intake structure being connected to the case by the peripheral inner panel via at least one structural peripheral flange partially covering the peripheral inner panel and to provide retention of at least one vane in case of loss thereof, the structural peripheral flange being independent of the case and the air intake structure, and the structural peripheral flange being U-shaped and comprising a flat middle portion connecting upstream and downstream ends thereof, wherein the structural peripheral flange extends longitudinally towards the upstream of the air intake structure such that the upstream end of the structural peripheral flange extends over a sector forming an angle of at least 15° defined by the upstream and downstream ends of the structural peripheral flange with a fastening leg of the vanes of the fan, and the upstream end is a free end.

2. The propeller assembly according to claim 1, wherein the structural peripheral flange is completely peripheral.

3. The propeller assembly according to claim 2, wherein the structural peripheral flange is continuous.

4. The propeller assembly according to claim 1, wherein the peripheral inner panel of the air intake structure completely covers the structural flange.

5. The propeller assembly according to claim 1, wherein the case has an inner wall extending at least partially below the structural peripheral flange.

6. The propeller assembly according to claim 1, wherein the case has an extension extending at least partially above the structural peripheral flange to cover connecting means between the flange and the peripheral inner panel of the air intake structure.

* * * * *